(12) United States Patent
Donato

(10) Patent No.: US 7,315,334 B2
(45) Date of Patent: Jan. 1, 2008

(54) CONTROLLING VIEWING DISTANCE TO A TELEVISION RECEIVER

(76) Inventor: Davide Salvatore Donato, 3975 Lloydtown Road, Kettleby, Ontario (CA) L0G 1J0

( * ) Notice: Subject to any disclaimer, the term of this patent is extended or adjusted under 35 U.S.C. 154(b) by 481 days.

(21) Appl. No.: 11/013,399

(22) Filed: Dec. 17, 2004

(65) Prior Publication Data

US 2005/0151882 A1 Jul. 14, 2005

(30) Foreign Application Priority Data

Dec. 17, 2003 (CA) ................................. 2453696

(51) Int. Cl.
*H04N 5/65* (2006.01)
(52) U.S. Cl. ...................................... 348/819
(58) Field of Classification Search ............... 348/553, 348/552, 725, 818, 819, 820, 162, 164, 169, 348/734, 156, 77; 340/686.6, 573, 540, 541, 340/567, 555, 552
See application file for complete search history.

(56) References Cited

U.S. PATENT DOCUMENTS

| | | | |
|---|---|---|---|
| 4,321,593 A * | 3/1982 | Ho et al. ..................... 340/541 |
| 4,417,278 A | 11/1983 | Hensleigh et al. |
| 4,550,341 A | 10/1985 | Naito |
| 4,831,448 A | 5/1989 | Park |
| 4,835,614 A | 5/1989 | Ryu |
| 4,843,464 A * | 6/1989 | Choi ........................... 348/163 |
| 5,191,231 A | 3/1993 | Berry |
| 5,355,180 A | 10/1994 | Back |
| 5,382,983 A | 1/1995 | Kwoh et al. |
| 5,408,276 A * | 4/1995 | Morales ....................... 348/818 |
| 5,493,302 A * | 2/1996 | Woll et al. ..................... 342/71 |
| 5,521,652 A * | 5/1996 | Shalvi ......................... 348/819 |
| 5,541,664 A | 7/1996 | Cuadrado |
| 5,592,148 A * | 1/1997 | Morales ....................... 340/540 |
| 5,751,335 A | 5/1998 | Shintani |
| 5,805,201 A * | 9/1998 | Fujiwara ...................... 348/818 |
| 5,886,730 A | 3/1999 | Tsosie |
| 5,917,256 A | 6/1999 | Broadbent, II |
| 6,002,427 A * | 12/1999 | Kipust ......................... 348/156 |
| 6,020,882 A | 2/2000 | Kinghorn et al. |
| 6,088,007 A | 7/2000 | Shioya |
| 6,226,793 B1 | 5/2001 | Kwoh |
| 6,259,486 B1 * | 7/2001 | Mahvi ......................... 348/553 |
| 6,927,696 B2 * | 8/2005 | Wasson Coley et al. . 340/686.6 |

* cited by examiner

*Primary Examiner*—Paulos Natnael

(57) ABSTRACT

A child is encouraged not to sit close to the screen of television receiver. A base unit on the television receiver has a proximity detector that senses whether the child is within a preset range forward of the television receiver. In response to a range violation, the base unit transmits a triggering signal on an RF carrier to a slave unit. In response to the triggering signal, the slave unit transmits an OFF command on an infrared carrier to a standard infrared sensor built into the television receiver. The command is identical to the OFF command transmitted by a remote control associated with the television receiver. Since the base and slave units communicate via an omnidirectional RF carrier, the slave unit can be freely positioned to ensure adequate line of sight transmission communication with the television receiver via the infrared carrier.

10 Claims, 3 Drawing Sheets

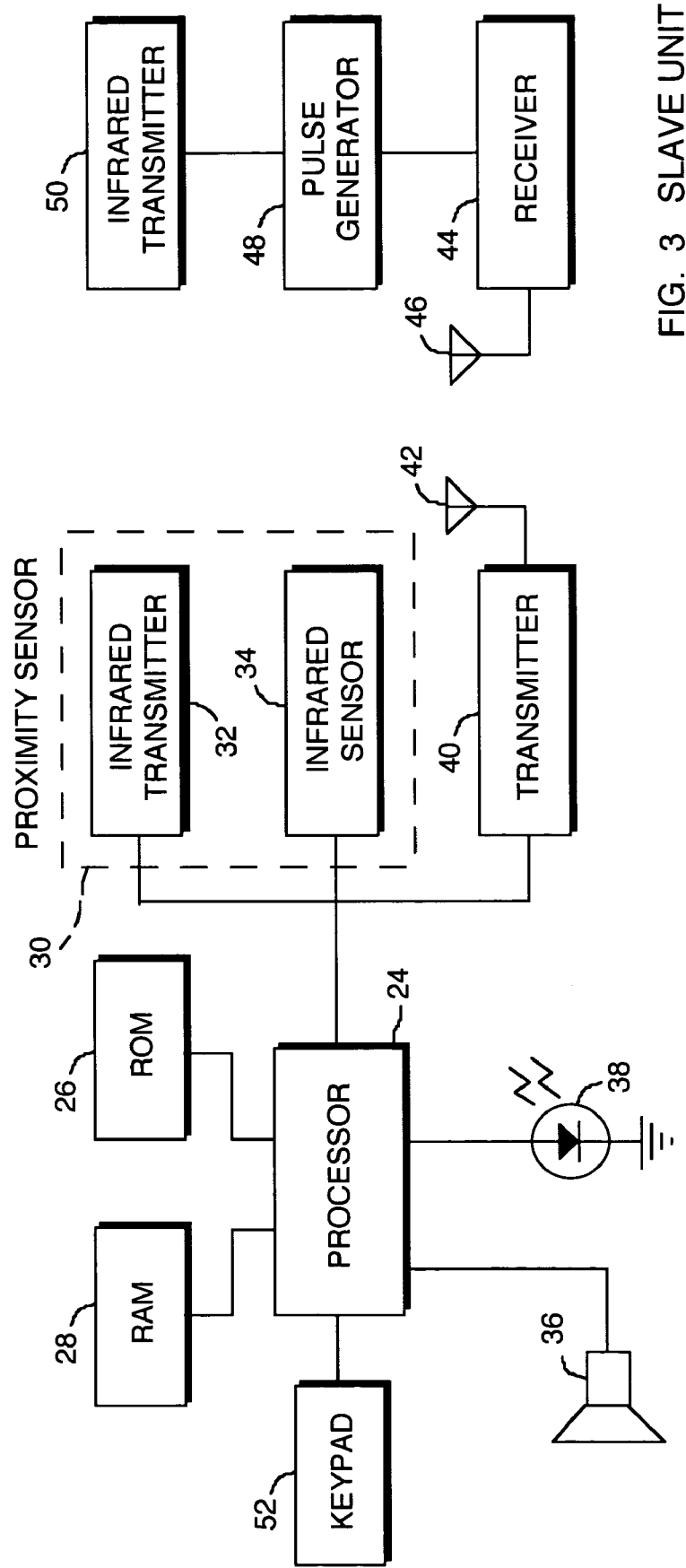

CONTROLLING VIEWING DISTANCE TO A TELEVISION RECEIVER

FIELD OF THE INVENTION

This invention relates to apparatus for controlling a television receiver in response to proximity of a person and has particular application to preventing children from sitting too close to a television screen.

BACKGROUND OF THE INVENTION

Many parents are concerned that sitting too close to a television screen may affect their children's vision. Various devices have been proposed to address the problem.

One prior art approach involves installing a controller in the television receiver itself. The controller uses a proximity sensor to detect whether an object is proximate to the receiver's screen, and generates an audible or visual warning signal through the speakers or screen of the television receiver itself. Such systems are described in U.S. Pat. No. 4,835,614 to Ryu, U.S. Pat. No. 4,831,448 to Park, and U.S. Pat. No. 5,355,180 to Back. A significant shortcoming is that the controller is built into the television receiver and does not lend itself to retrofitting an existing receiver.

U.S. Pat. No. 5,541,664 to Cuadrado describes a viewing distance controller that is entirely external to a television receiver. The television receiver is plugged into a power socket associated with the controller. The controller has a distance sensor that detects the proximity of an object to the screen, and a timing circuit that switches power to the socket and thus the television receiver in response to distance violations. The controller can be readily used with various television receivers but shutting off power to a contemporary television receiver has the undesirable effect of clearing all settings preprogrammed by a user.

U.S. Pat. No. 4,417,270 to Hensliegh et al describes another system for controlling viewing distance. An acoustic proximity sensor is used to detect whether a child is too close to a television receiver. An interference generator then radiates high energy pulses into the circuitry of the television receiver to disrupt the screen image.

BRIEF SUMMARY OF THE INVENTION

In one aspect, the invention provides apparatus for controlling a television receiver in response to proximity of a person. The invention is used with a television receiver that has a line of sight signal sensor, a remote control that transmits commands encoded on a line of sight carrier signal to the signal sensor, and a built-in controller that operates the television receiver in response to receipt of an encoded command. The commands to which the controller typically responds include an ON command, an OFF command, a volume command, a channel command setting the view channel, and menu and setting commands. The sensor and remote control commonly communicate via an infrared signal carrier, which tends to be directional and requires essentially a clear line of sight between transmitter and sensor. Signal carriers that are strongly directional are referred to in this specification as "line of sight" carriers, and the sensors and transmitters coupled by such carriers are similarly described.

The apparatus comprises a base unit positioned adjacent to the television receiver to detect range violations, and a slave unit that can be freely positioned for line of sight communication with receiver's signal sensor. The base unit has proximity sensing means for sensing whether a person is within a predetermined range forward of the television screen, transmitting means for transmitting a triggering signal, and control means responsive to the proximity sensing means that initiate transmission of the triggering signal. The slave unit has receiving means for receiving the triggering signal from the base unit, transmitting means for transmitting commands encoded on the line of sight carrier signal to the sensor of the television receiver, and control means responsive to the received triggering signal for actuating transmission of a command. The base and slave units are preferably coupled for wireless communication via a signal carrier distinct from the line of sight carrier and preferably omnidirectional.

The principal use of the apparatus is to transmit ON and OFF commands to a television receiver to control the viewing habits of children, specifically to discourage them from sitting too close to the screen. In such an application, the base unit may have an audible or visual warning indicator adapted to generate a warning signal, and a digital processor that actuates the indicator to warn a child that he is too close to the television receiver. The processor may be programmed to initiate transmission of an OFF triggering signal to the slave unit if the child remains in range for more than a preprogrammed delay period. The slave unit responds to the triggering signal from the base unit by transmitting an OFF command to the television receiver, stopping viewing. After a predetermined delay period, the processor of the base unit may initiate transmission of an ON triggering signal provided that the proximity sensing means no longer detect the child in range. To ensure that the child does not turn the television receiver on manually or with a remote control during an OFF period, the processor may be programmed to transmit the OFF triggering signal repeatedly, effectively disabling other controls. Also, the number of violations of the range may be recorded, and the delay period before an OFF signal is transmitted in response to the next detection of a range violation may be shortened, further disciplining the child.

Other aspects of the invention will be apparent from a description below of preferred embodiments and will be more specifically defined in the appended claims.

BRIEF DESCRIPTION OF THE DRAWINGS

The invention will be better understood with respect to drawings in which:

FIG. 2 is a schematic illustration of the base unit;

FIG. 3 is a schematic illustration of the slave unit; and,

PREFERRED EMBODIMENTS OF THE INVENTION

Figure 1:
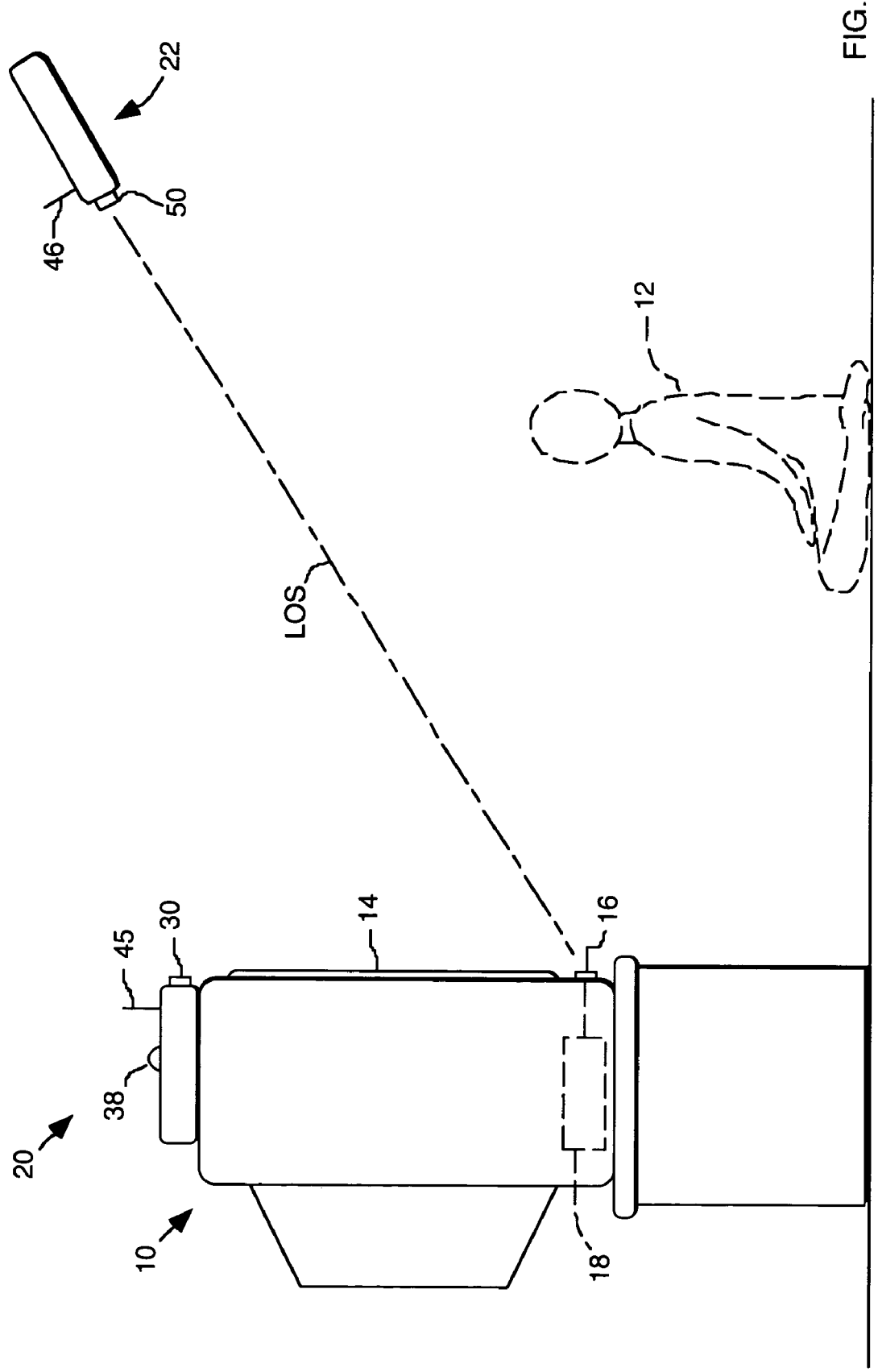
FIG. 1 is a schematic illustration of a television receiver and base and slave units that control the receiver in response to proximity of a child.

Reference is made to FIG. 1 which illustrates a television receiver 10 and apparatus for controlling the receiver 10 in response to proximity of a child 12. The television receiver 10 is conventional and among other things comprises a screen 14, an infrared sensor 16, and control circuitry 18 (shown in ghost outline) that controls operation of the television receiver 10 in response to signals received at the sensor 16. The signals are essentially digital commands encoded on an infrared carrier, and a wide range of commands are normally implemented. These include channel selection commands, menu selection, setting specification, and two commands of particular interest, an ON command which instructs the controller to power up the video and audio components (not illustrated) of the television receiver 10 and an OFF command which instructs the controller to shut down the video and audio components. Commands are normally transmitted to the sensor 16 with a remote control (not shown). These matters are entirely conventional and will not be described further.

The control apparatus consists of two components: a base unit 20 located on the television receiver 10, and a slave unit 22 remote from the television receiver 10 and preferably mounted to a ceiling (not shown). The overall operation of the units 20, 22 will be briefly summarized. The base unit 20 determines whether the child 12 is in or out of range and triggers the slave unit 22 to transmit commands to the television receiver 10, to turn the television receiver 10 on or off. The slave unit 22 communicates with the television receiver 10 via an infrared carrier in precisely the same manner as the remote control that otherwise operates the television receiver 10. Although the base and slave units 20, 22 can communicate over wire, the base unit 20 preferably communicates with the slave unit 22 via a conventional radio frequency (RF) carrier which is omnidirectional. This greatly simplifies the positioning of the slave unit for communication with the receiver 10. The RF carrier used to transmit triggering signals is distinct from the infrared carrier that carries command, which avoids interference with normal operation of the television receiver 10.

The base unit 20 is illustrated in the block diagram of FIG. 2. It comprises a digital processor 24 associated with ROM 26 that stores program code for operation of the processor 24 and RAM 28 that allows storage of temporary data and the like. The base unit 20 comprises a conventional proximity sensor 30 including an infrared transmitter 32 that emits infrared electromagnetic radiation and an infrared sensor 34 that produces a local detection signal in response to the radiation reflected from an object. That signal is transmitted to the processor 24 to indicate the presence or absence of the child 12 within a predetermined range. With the base unit 20 positioned atop the television receiver 10 as shown in FIG. 1, the proximity sensor 30 determines if the child 12 (more generally any large warm object) is with a predetermined range forward of the screen 14. In response to detection of the child 12 within range, the processor 24 actuates a speaker 36 to produce a beeping sound and actuates an indicator LED 38 to visually indicate that child 12 is too close to the screen 14. The speaker 36 and LED 38 will normally be associated with conventional drivers (not shown) to permit the processor 24 to activate these components. The base unit 20 also includes a transmitter 40 with antenna 42 that is used to transmit omnidirectional RF triggering signals to the slave unit 22.

The slave unit 22 is illustrated in the block diagram of FIG. 3. The function of the slave unit 22 is essentially to convert the RF triggering signal from the base unit 20 into a command encoded on an infrared carrier as would the remote control associated with the television receiver 10. The slave unit 22 comprises an RF receiver 44 with antenna 46 for receiving triggering signals from the base unit 20. Each triggering signal encodes the relevant command as a series of corresponding pulses. A pulse generator 48 contains circuitry that extracts the pulses and drives an infrared transmitter 50 to encode the command on an infrared carrier.

As shown in FIG. 1, the infrared transmitter 50 is aligned along a line of sight designated "LOS" in FIG. 1 with the corresponding sensor 16 of the television receiver 10.

The base unit 20 has a parameter-setting mode of operation. This is initiated by a mode control which may be a keypad 52 for number entry. One function is to store predetermined commands appropriate for the particular television receiver 10. This programming of the base unit 20 is done in a conventional manner corresponding to the manner in which universal remote controls are programmed to operate a particular television receiver. The user enters a code on the keypad 52 initiating a command-recording mode. The keyboard has an ON button which is then pressed, the remote control is placed proximate to the infrared sensor 34 and its ON button is pressed, and then an enter button on the keypad 52 is pressed to signal the process to record processor 24 record the ON commands in RAM 28. The OFF command is similarly recorded. Other functions in the parameter-setting mode include adjusting the volume of the speaker 36, enabling or disabling the speaker 36, expanding or contracting the detection range, and specifying the OFF time during which the television receiver 10 is shut off after a violation of the specified range.

Figure 4:
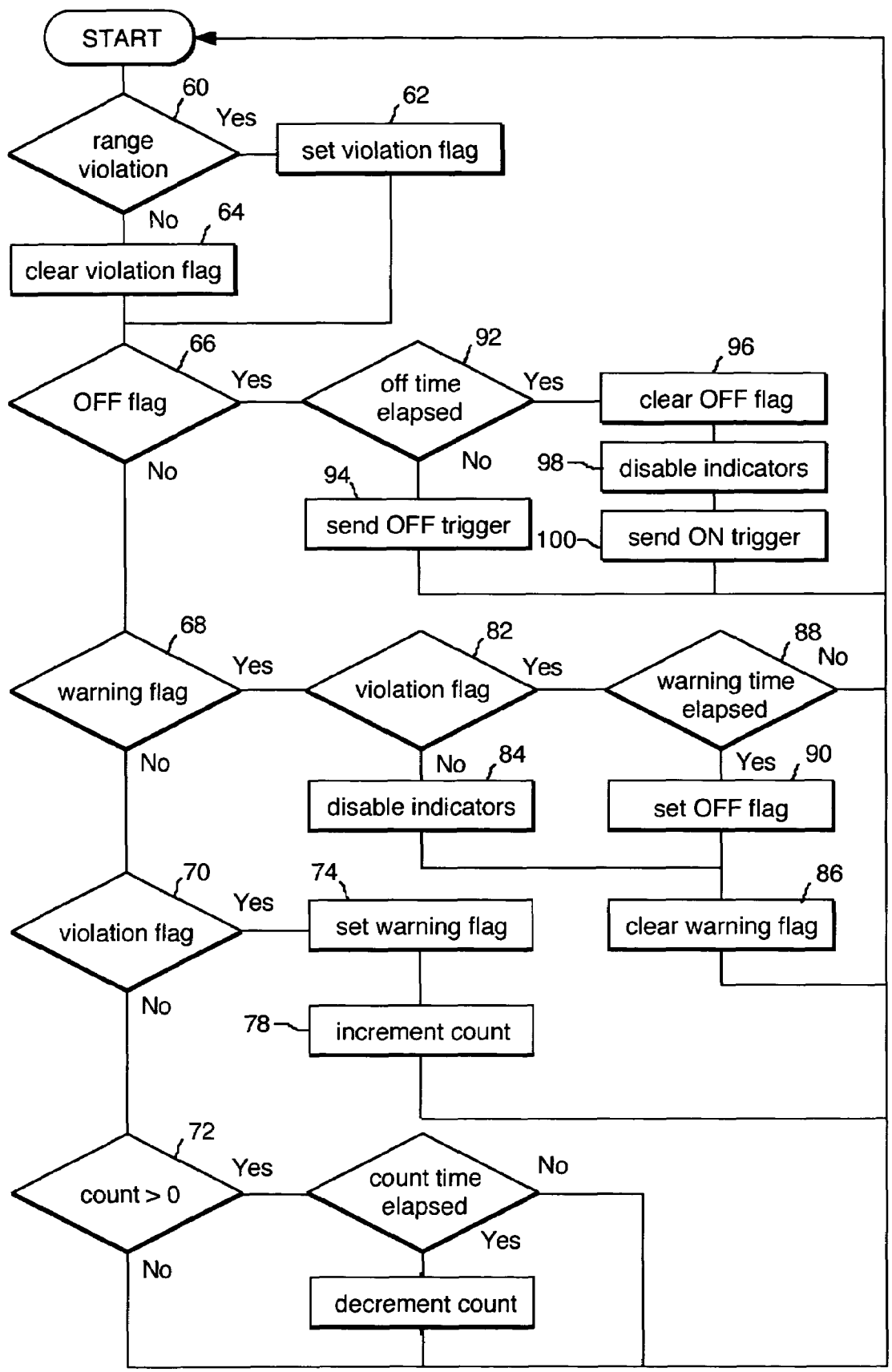
FIG. 4 is a flow chart illustrating how the base unit operates. Unless otherwise indicated with arrows, the direction of process flow in the chart is down and away from "Yes" and "No" ends of decision boxes.

How the base unit 20 operates is illustrated in the flow chart of FIG. 4. A preliminary routine (not shown) clears flag variables: a "violation flag" that indicates whether a range violation has occurred; a "warning flag" that indicates the base unit 20 has entered a warning mode of operation in response to a violation of the restricted range; and an "OFF flag" that indicates the base unit 20 has entered a mode of operation in which the television receiver 10 is shut off. The processor 24 also clears a count variable that stores the number of range violations outstanding. It should be noted that the times at which the warning and OFF flags are set as well as the time at which the violation count is changed are automatically recorded in appropriate variables, and should be understood as included in each setting step, although not separately indicated in FIG. 4. The violation indicators (speaker 36 and LED 38) are also disabled. The processor 24 then cycles through the loop shown in FIG. 4, beginning at START.

The loop checks several conditions. First, the processor 24 checks whether the proximity sensor 30 currently indicates a range violation (step 60). It sets the violation flag (step 62) or clears the violation flag (step 64) accordingly. The processor 24 then checks other conditions: whether the OFF flag is set (step 66), whether the warning flag is set (step 68), whether the violation flag is set (step 70), and finally whether the violation count is not zero (step 72). If any one of the conditions is true, the routine branches to condition handling statements and then returns to START to begin another cycle.

After start up, the first condition potentially detected is a range violation identified when the violation flag is set. The violation flag is checked at step 70. If a violation has occurred, the warning flag is set (step 74) and time of setting recorded. The violation indicators (speaker 36 and LED 38) are then activated (step 76) to warn the child 12 that he has stepped into the restriction range, and the violation count is incremented (step 78).

On the next cycle, the processor 24 detects that the warning flag has been set (step 68) and enters a warning mode of operation. It checks the status of the violation flag (step 82) to determine whether the child 12 remains in the restricted range. If the violation flag is clear, indicating the child 12 has stepped out of range in response to warnings, the violation indicators are disabled (step 85) and the warning flag is cleared (step 86). Otherwise, the processor 24 proceeds to check whether time elapsed since setting of the warning flag (step 88). If the duration of the warning phase exceeds a predetermined time limit, the OFF flag is set (step 90) and the warning flag is cleared (step 86), essentially indicating that the warning mode is over. The duration of the warning period is a function of the violation count, decreasing as the recorded violation count increases. Thus, if the child 12 repeatedly violates the restricted range, the television receiver 10 is shut off faster.

With the OFF flag set, the processor 24 enters its OFF mode of operation. First, the processor 24 checks whether the time since the OFF flag was set exceeds a predetermined value (step 92). If the OFF period has not elapsed, the processor 24 simply causes an OFF trigger signal to be transmitted to the slave unit 22 (step 94). The slave unit 22 responds by transmitting an OFF command to the television receiver's sensor 16, shutting the television receiver 10 off. Repeated transmission of the OFF command prevents the child 12 from turning the television receiver 10 on manually or with a remote control before required OFF time has expired. If the OFF period has elapsed, the violation flag is cleared (step 96) and the violation indicators are disabled (step 98). The processor 24 then causes the base unit 20 to transmit an ON triggering signal to the slave unit 22 (step 100), which responds by transmitting an ON command encoded on its infrared carrier to the television receiver 10. All flags should now be clear.

If the OFF flag, warning flag and violation flag are clear, the processor 24 checks the violation count (step 72). If the count is non-zero, the processor 24 checks how much time has elapsed since the last time the violation counter was changed (step 102). If a preset period of time has been exceeded, the processor 24 decrements the violation count, and records the time at which the count was decremented (step 104). Thus, while the child 12 continues to remain out of range, the violation count is decremented. This effectively causes the warning period to shorten as the violation count is increasing and to lengthen if the child 12 remains out of range for a sufficient length of time.

It will be appreciated that a particular embodiment of the invention had been described, and that modifications may be made without departing from the scope of the appended claims. In particular, proximity detection is performed exclusively by the base unit but other functions can be transferred to the slave unit if provided with a processor.

I claim:

1. Apparatus for controlling a television receiver in response to proximity of a person, the television receiver comprising a screen, a line of sight signal sensor, a remote control for transmitting commands encoded on a line of sight carrier signal to the signal sensor, and a controller that controls the television receiver in response to receipt of an encoded command by the signal sensor, the apparatus comprising:

a base unit adjacent to the television receiver, the base unit comprising proximity sensing means for sensing if a person is within a predetermined range forward of the television screen, transmitting means for transmitting a triggering signal, and control means response to the proximity sensing means for actuating the transmitting means to transmit the triggering signal; and, a slave unit remote from the television receiver, the slave unit comprising receiving means for receiving the triggering signal from the base unit, transmitting means for transmitting a command encoded on the line of sight carrier signal to the sensor of the television receiver, and control means responsive to the received triggering signal for actuating the transmitting means to transmit the command.

2. The apparatus of claim 1 in which the transmitted command instructs the controller to shut the television receiver off.

3. The apparatus of claim 2 in which:

the base unit comprises indicator means for producing an audible or visual warning signal; and, the control means actuate the indicator means when the proximity sensing means sense a person within the range and actuate the transmitting means to transmit the triggering signal if the person remains within the range for a predetermined period of time.

4. The apparatus of claim 2 in which the transmitting means of the base unit and the receiving means of the slave unit are adapted for wireless transmission and receipt of the triggering signal via an omnidirectional signal carrier.

5. Apparatus for controlling a television receiver in response to proximity of a person, the television receiver comprising a screen, a line of sight signal sensor, and a controller that controls the television receiver in response to predetermined commands received by the signal sensor encoded on a line of sight carrier signal, the commands including an ON command and an OFF command, the apparatus comprising:

a base unit adjacent to the television receiver, the base unit comprising proximity sensing means for sensing when a person is within a predetermined range forward of the television screen, transmitting means for transmitting triggering signals, and control means responsive to the proximity sensing means and predetermined criteria for actuating the transmitting means to transmit an ON triggering signals corresponding to the ON command and an OFF triggering signal corresponding to the OFF command; and, a slave unit remote from the television receiver, the slave unit comprising receiving means for receiving the triggering signals from the base unit, transmitting means for transmitting the ON and OFF commands encoded on the line of sight carrier signal to the signal sensor of the television receiver, and control means for actuating the transmitting means in response to a received ON or OFF triggering signal to transmit the corresponding ON or OFF command.

6. The apparatus of claim 5 in which:

the base unit comprises indicator means for generating an audible or visual warning signal; and, the control means of the base unit comprise a digital processor programmed to actuate the indicator means to generate the warning signal when the proximity sensing means sense the presence of the person within range, and actuate the transmitting means of the base unit to transmit the OFF triggering signal if the person remains in range for more than a predetermined period of time.

7. The apparatus of claim 6 in which the digital processor of the base unit is programmed to actuate the transmitting means of the base unit to transmit the ON triggering signal after a predetermined OFF period of time following transmission of the OFF triggering signal if the proximity sensing means do not sense the presence of a person within the range.

8. The apparatus of claim 7 in which the digital processor of the base unit is programmed to repeatedly transmit the OFF triggering signal during the OFF period whereby the television receiver cannot be kept on with manual controls or a remote control associated with the receiver during the OFF period.

9. The apparatus of claim 7 in which:
the predetermined criteria include at least the number of times the presence of the person is detected in the predetermined range; and,
the digital process is programmed to record a count corresponding to the number of times the presence of the person is detected in the predetermined range and to reduce the predetermined period of time before the OFF signal is transmitted in response to the record count.

10. The apparatus of claim 5 in which the transmitting means of the base unit and the receiving means of the slave unit are adapted for wireless transmission and receipt of triggering signal via an omnidirectional signal carrier.

* * * * *